US007098421B1

(12) United States Patent
Pierce, Jr.

(10) Patent No.: US 7,098,421 B1
(45) Date of Patent: Aug. 29, 2006

(54) LONG LASTING TORCH

(76) Inventor: Joseph Frank Pierce, Jr., P.O. Box 2017, Blue Ridge, GA (US) 30513

( * ) Notice: Subject to any disclaimer, the term of this patent is extended or adjusted under 35 U.S.C. 154(b) by 340 days.

(21) Appl. No.: 10/252,471

(22) Filed: Sep. 23, 2002

(51) Int. Cl.
*B23K 10/00* (2006.01)

(52) U.S. Cl. ............................ 219/121.48; 119/121.48; 119/121.52; 119/75; 110/250; 373/18

(58) Field of Classification Search ............ 219/121.36, 219/121.48, 121.52, 121.5, 74, 75, 121.57, 219/119; 110/250, 235; 373/18, 22, 19; 588/901
See application file for complete search history.

(56) References Cited

U.S. PATENT DOCUMENTS 5,319,176 A * 6/1994 Alvi et al. ............. 219/121.59
5,548,611 A * 8/1996 Cusick et al. ................. 373/18
5,734,673 A * 3/1998 Kurahashi et al. ............ 373/20
5,785,923 A * 7/1998 Surma et al. ............... 266/144
5,798,496 A * 8/1998 Eckhoff et al. ........ 219/121.36

OTHER PUBLICATIONS

"Evaluation of Plasma Arc Technology for the Treatment of Municipal Solid Wastes In Georgia," Jan. 1997.

* cited by examiner

*Primary Examiner*—Mark H. Paschell
(74) *Attorney, Agent, or Firm*—King & Spalding LLP

(57) ABSTRACT

The invention is a transferred or non-transferred plasma arc torch for use in a fuel gas generator system for generating electricity from waste, wherein the torch includes a torch housing, electrodes (one in a transferred torch, two in a non-transferred torch), a tubular sleeve member, a coolant flow path, a vortex mechanism, and a power supply circuit connected to the rear and front electrodes that generates an arc that is adapted to extend axially from the rear electrode through the vortical flow of gas and to an attachment located on the bore of the front electrode, and wherein the electrodes are metal coated in order to protect from wear during use.

12 Claims, 4 Drawing Sheets

LONG LASTING TORCH

FIELD OF THE INVENTION

The present invention concerns a long-lasting plasma torch used with a particular electricity producing generators with a special coating applied to the electrodes.

BACKGROUND OF THE INVENTION

Torches have been used in a variety of ways to cut and melt product. Plasma torches are known. Four-nozzle or four torch plasma generators are known, wherein each torch has an anode and an electrode chamber connected to a DC power source. The four-nozzle plasma generators create plasma jets whose shape and trajectory is controlled by an external magnetic field system.

Four nozzle generators are expensive. The four-nozzle plasma generator is described in the document entitled *Basis For Implementation Of The Method For Dynamic Plasma Treatment Of The Surface Of A Solid Body,* P. P. Koulik et al., Plasmochimie 87" Part 2, Moscow, 1987, pp. 58 to 96.

The construction of the electrode chambers (anode and cathode) for a plasma generator is described in the document entitled *Twin Jet Plasmatron,* I. I. Genbaiev, V. S. Enguelsht, Frounze, 1983.

A need had existed for a better combination of metals to coat the electrodes in the torches. The electrodes in torch tend to wear because of the severe conditions the electrodes are subjected to during use.

A need had existed for a cheaper two-nozzle generator with a specific configuration for the plasma streams that does not require the additional use of magnetic fields. A need has existed for a two-nozzle generator that enables efficient introduction and processing of different products, including waste from municipalities and from medical facilities. Traditionally, torches of the type needed in the two-torch generator have broken down and needed repair often. The maintenance costs have been high. A need has existed for a long lasting torch for the two-nozzle generator that provides high performance in output of plasma and high reliability.

SUMMARY OF THE INVENTION

The invention relates to a long lasting torch that can be used in a plasma generator and related system.

The invention is a transferred or non-transferred plasma arc torch for use in a fuel gas generator system for generating electricity from waste. The torches include a torch housing, electrodes (one in a transferred torch, two in a non-transferred torch), a tubular sleeve member, a coolant flow path, a vortex mechanism, and a power supply means connected to the rear and front electrodes that generates an arc that is adapted to extend axially from the rear electrode through the vortical flow of gas and to an attachment located on the bore of the front electrode. The electrodes are metal coated in order to protect from wear during use.

BRIEF DESCRIPTION OF THE DRAWINGS

The present invention will be explained in greater detail with reference to the appended figures, in which.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
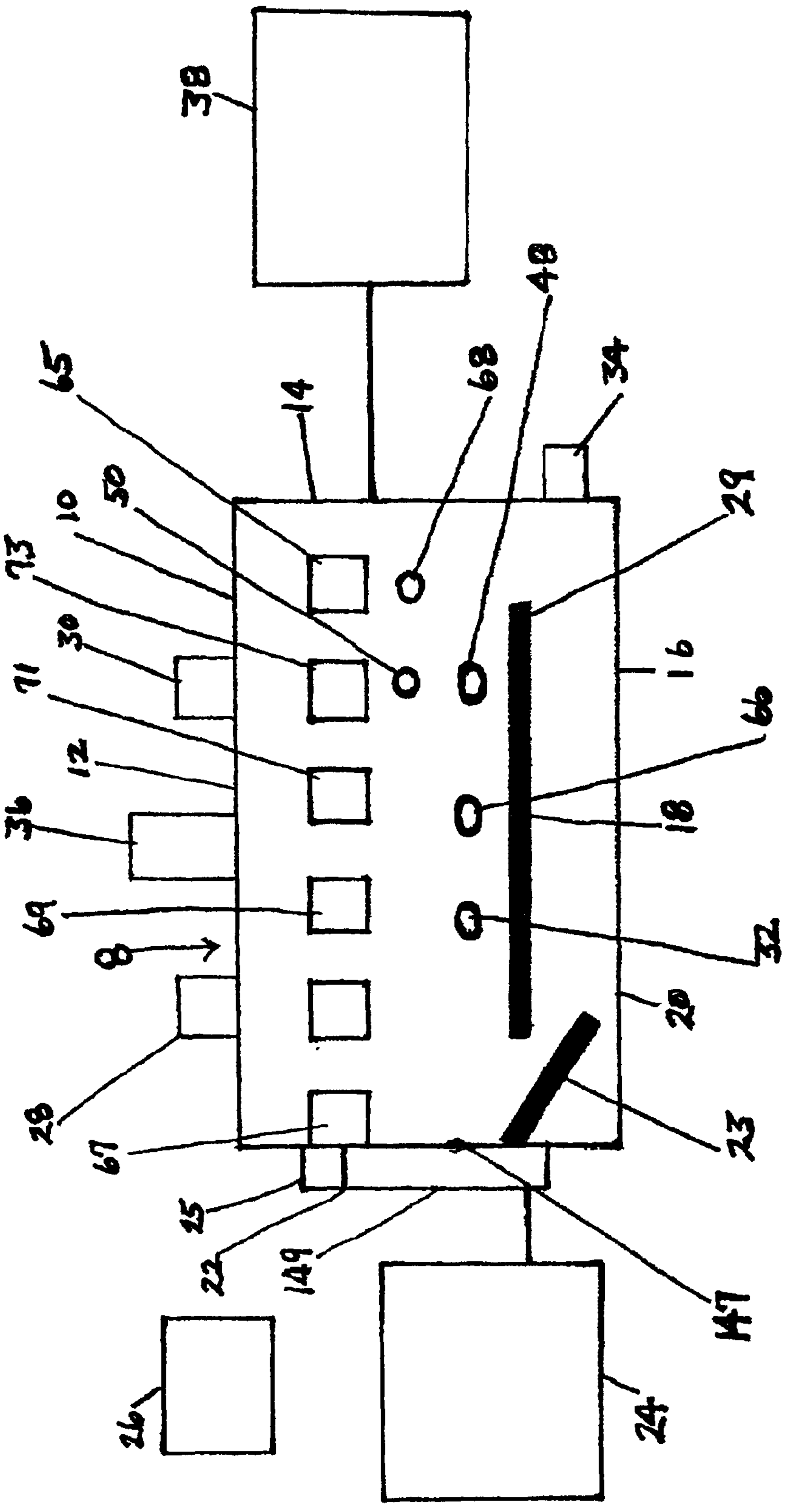
FIG. 1 is a side view of the generator.

The generator into which these torches are installed is shown in more detail in FIG. 1 wherein the generator system (8) is shown having a vessel (10) which is also called a process chamber having with a front (12), a back (14), a bottom (16), a first side (18) a second side (20) a third side (22) and a feed ramp (23) that communicates with sealable opening (25)

The feed ramp is used to provide the waste material into the vessel, such as by rolling or by sliding into the container from a feed system. An optional feed system, such as an automatic feed system (24) could be used within the scope of the generator system.

Figure 2:
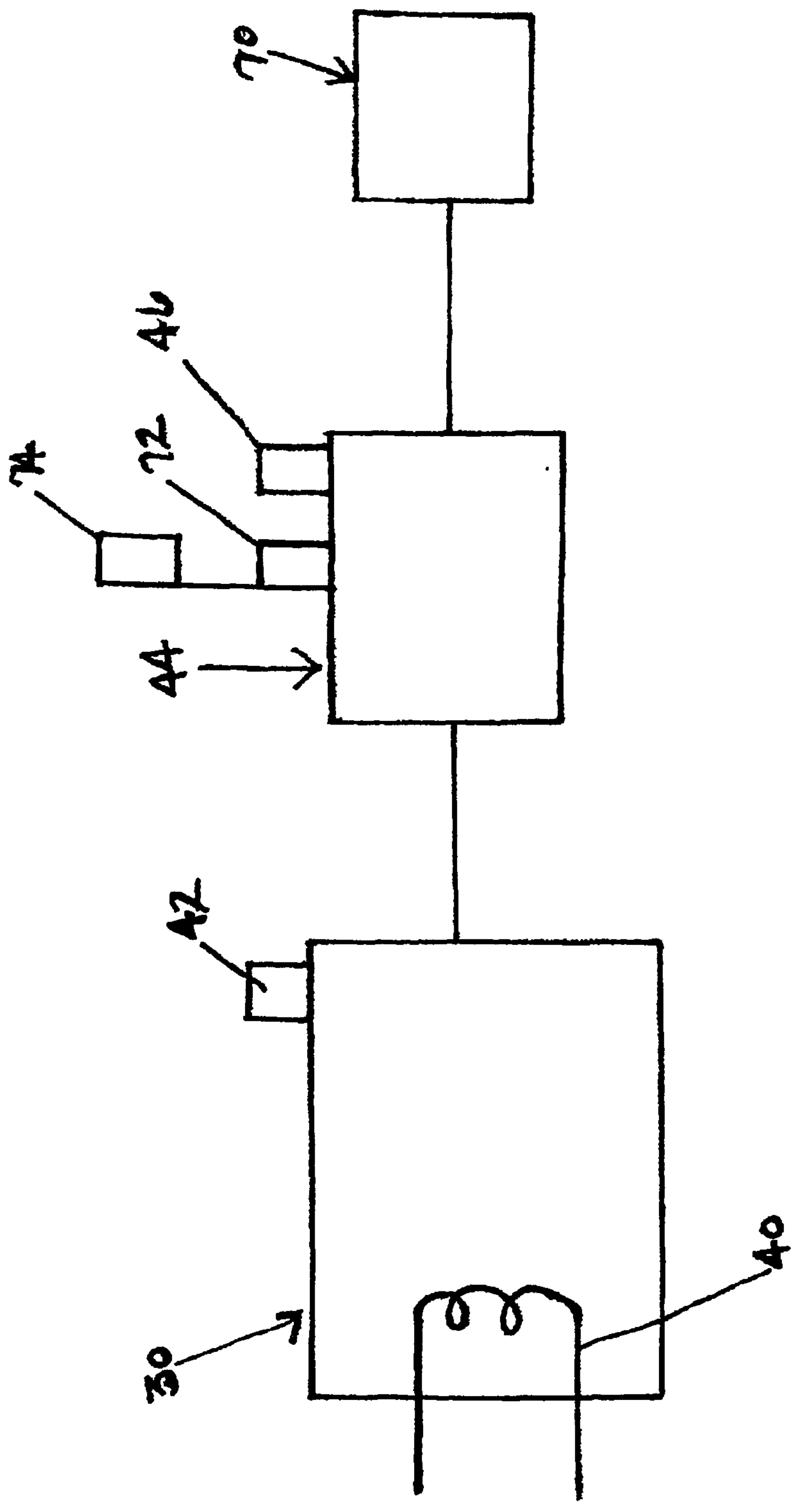
FIG. 2 is a side view of the generator with a torch attached in the invention.
Figure 3:
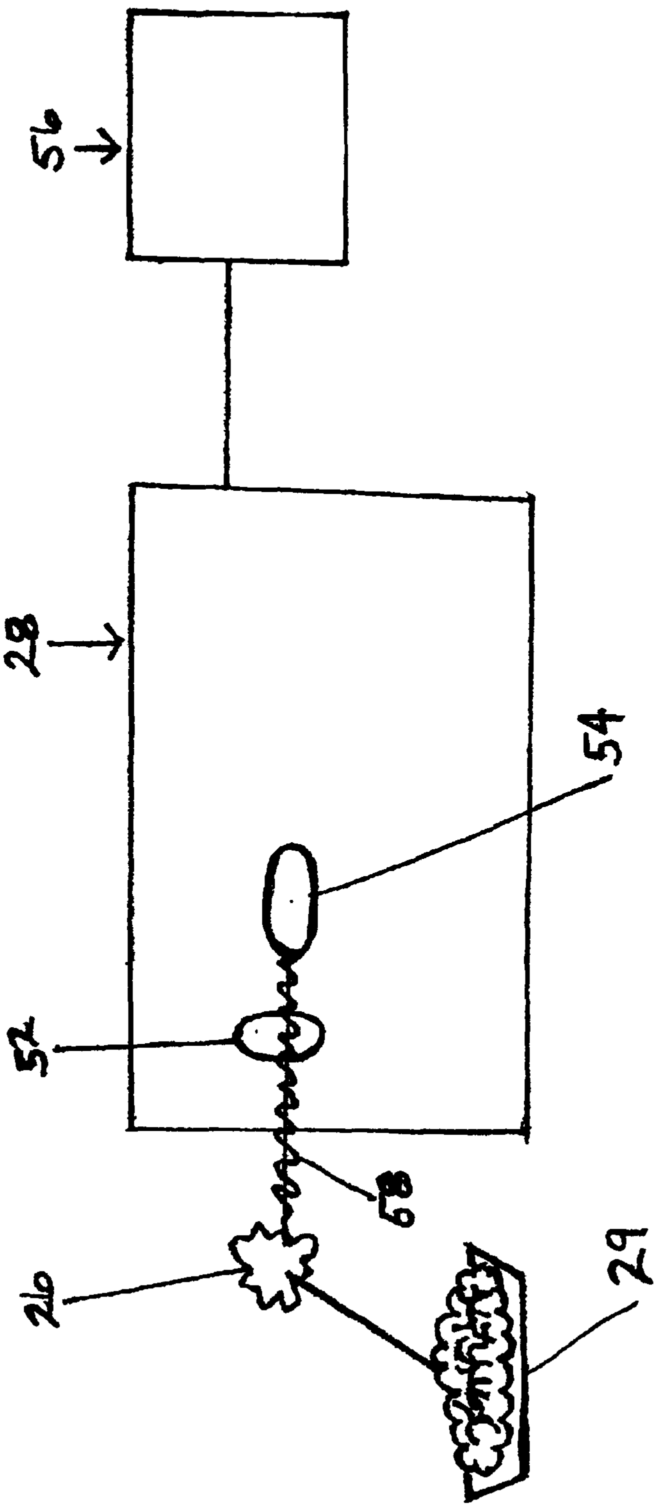
FIG. 3 is a side view of the torch.

The vessel (10) contains at least two plasma torches that are shown in more detail in FIG. 2 and FIG. 3.

The non-transferred plasma arc torch is made of a. a torch housing;

b. a rear electrode mounted within the housing and comprising a tubular metal member having a closed inner end and an open outer end;

c. a front electrode comprising a tubular metal member having a bore therethrough, the front electrode being mounted within the housing and in coaxial alignment with the rear electrode and having an inner end adjacent the open outer end of the rear electrode and an opposite outer end, and with the bore including an inner cylindrical end portion and an outer end portion which is cup-shaped in cross section to define an outwardly facing radial shoulder, and with the inner cylindrical end portion having a substantial axial length;

d. a tubular sleeve member mounted to the housing and coaxially surrounding the front electrode in a spaced apart arrangement so as to define an annular passageway between the front electrode and the sleeve that extends along substantially the entire axial length of the front electrode;

e. a coolant flow path that extends through the housing and communicates with the annular passageway such that a fluid coolant circulates through the annular passageway to remove heat from the front electrode during operation of the torch;

f. a vortex mechanism that generates a vortical flow of a gas at a location intermediate the rear and outer electrodes and that is in coaxial alignment with the rear and front electrodes; and g. a power supply means connected to the rear and front electrodes that generates an arc that is adapted to extend axially from the rear electrode through the vortical flow of gas and to an attachment located on the bore of the front electrode.

Instead of a non-transferred torch, a transferred torch can be used. A transferred torch only uses one electrode rather than two electrodes.

The transferred and non-transferred plasma arc torches have a coating disposed on the electrodes made from silver, platinum, nickel, alloys thereof, and combinations thereof. In the preferred embodiment, the coating disposed on the electrodes is 70% silver, 20% platinum, and 10% nickel.

The transferred and non-transferred plasma arc torches can have a pivotably base. They can also be 2-megawatt DC-powered torches.

The coolant flow path of both the transferred and the non-transferred plasma arc torch can extend serially along the outer surface of the rear electrode and through the annular passageway and such that a fluid coolant may be circulated through the coolant flow path to remove directly heat from both the rear electrode and front electrode during operation of the torch.

FIG. 2 shows the moveable non-transferred torch (28) that is disposed in at least one side of vessel (10) for contacting waste (26) and creating molten material (29).

FIG. 3 shows the second plasma torch that is disposed in vessel (10), wherein the second torch is termed a moveable transferred torch (30) and this torch is used for contacting the molten material (29). The two plasma torches can be disposed in the same side or top of the vessel, or they could be disposed on opposite sides. Preferably each torch is pivotable and rotatable and swivel able. Additionally, in a preferred embodiment, the first torch points at the waste material as it goes down the ramp and the second plasma torch points at the molten pool created in the bottom of the vessel by the first torch, keeping the pool hot and further melting any additional waste which is not yet melted.

It is also shown in FIG. 1, that the generator system can include a hydrocarbon injector (48) disposed in at least one side of the vessel for injecting into the waste: oil, other hydrocarbons sewage, sludge or combinations thereof, into the vessel for treatment along with the waste.

FIG. 1 also shows an optional gas BTU enhancer port (66) for inputting a BTU enhancing material (68) to the vessel to increase the BTU ratings of the gas from the gas outlet. It is contemplated that the BTU enhancer material is a calcium carbonate material. Lime is also considered a usable BTU enhancer for this generator system.

The generator system includes a dry scrubber (38) can further comprises a heat exchanger (40) for removing heat from the gas as it passes through the dry scrubber. A wet scrubber outlet (46) can optimally be connected to a storage tank (70). Further optional considerations include that the wet scrubber can be connected to a wet scrubber flare outlet (72) connected to a flare (74).

Once again returning to FIG. 1, it is shown that the generator system comprises an oxygen injector port (50) disposed in at least one side of the vessel for injecting oxygen into the vessel. The oxygen used in this injector point may be liquid oxygen or oxygen gas.

As to the specifics of the vessel design for the generator system, it is contemplated that the feed ramp can have an angle of inclination between 30–51 degrees between the feed system and the molten material, and more preferably between 30–40 degrees, most preferably the angle of inclination of the feed ramp is 40 degrees between the feed system and the molten material.

It is also contemplated that the sides, front and bottom of the vessel are welded together. These components are contemplated to comprise a 1-inch thick metal alloy. The metal alloy can comprise a member of the group: carbon steel and its alloys, stainless steel and its alloys, titanium and its alloys, and combinations thereof Overall, the vessel is contemplated to have a height between 12 feet and 400 feet, and a length between 10 feet and 400 feet, and a width of between 5 feet and 400 feet. More preferably, the generator has a height between 12 feet and 18 feet, and a length between 10 feet and 30 feet, and a width of between 5 feet and 14 feet.

FIG. 3 provides details on the moveable non-transferred torch (28). This torch has an anode (52) and cathode (54) connected to a power supply (56) for creating an arc (58) to contact with the waste (26) in the vessel (10). The non-transferred torch is adapted to be rotatable to 180 degrees, and adapted to be vertically moveable in the vessel. Preferably, the non-transferred torch is a 2-megawatt, water-cooled torch. It is also contemplated that the non-transferred torch is further adapted to be moveable horizontally.

The power supply is contemplated to be a DC-power supply for the torch.

Figure 4:
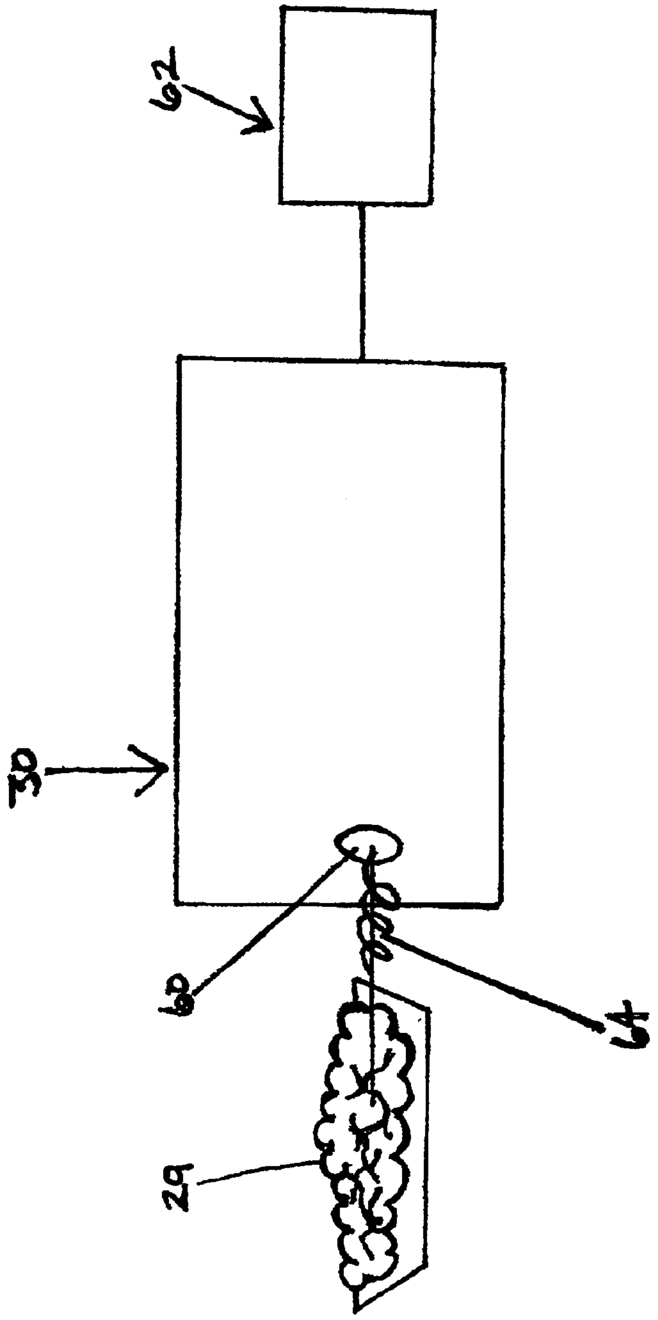
FIG. 4 is a side view of the transferred torch.

FIG. 4 shows the moveable transferred torch (30) has an transferred torch anode (60) connected to a transferred torch power supply (62) for creating a transferred torch arc (64) to contact with the molten material (29) in the vessel and the transferred torch is adapted to be rotatable to 180 degrees, and adapted to be vertically moveable in the vessel. This transferred torch is contemplated to be a 2-megawatt, water-cooled torch. It is also contemplated that this transferred torch is further adapted to be moveable horizontally. The transferred torch power supply could be a DC-power supply.

The waste treatable in the system can be a member from the EPA category of MUNICIPAL SOLID WASTE, SPECIAL WASTE comprising tires and medical waste or HAZARDOUS WASTE or combinations thereof.

The molten material for the generator is contemplated to be steel, carbon or combinations thereof. The molten material outlet (34) preferably has an outer diameter between 2 inches and 6 inches.

In one embodiment, the gas outlet has an outer diameter between 4 and 6 inches and is externally cooled, such as water-cooled.

It is also contemplated that the vessel has at least five insulating walls disposed adjacent the sides of the vessel as shown in FIG. 1, elements (65), (67), (69), (71) and (73). These insulating walls preferably comprise a non-stick refractory material, such as ruby brick refractory material.

While this invention has been described with emphasis on the preferred embodiments, it should be understood that within the scope of the appended claims, the invention might be practiced other than as specifically described herein.

What is claimed is:

1. A non-transferred plasma arc torch for use in a fuel gas generator system for generating electricity from waste, wherein fuel gas generator system comprising a vessel comprising a front, a back, a bottom, a first side, a second side, a third side, and a feed ramp; a moveable non-transferred plasma torch disposed in at least one side of the vessel for contacting the waste and creating molten material; a moveable transferred plasma torch disposed in at least one side of the vessel for contacting the molten material; at least one steam injector disposed in at least one side of the vessel; at least one molten material outlet disposed in the back of the vessel; a dry scrubber connected to the vessel for receiving gas from the vessel and forming treated gas; a wet scrubber connected to the dry scrubber for scrubbing the treated gas; a steam boiler connected to the wet scrubber for receiving the scrubbed treated gas and burning the gas creating steam; and a steam turbine connected to the steam boiler for creating electricity, and wherein the non-transferred plasma arc torch comprises:

a. a torch housing;

b. a rear electrode mounted within the housing and comprising a tubular metal member having a closed inner end and an open outer end;

c. a front electrode comprising a tubular metal member having a bore therethrough, the front electrode being mounted within the housing and in coaxial alignment with the rear electrode and having an inner end adjacent the open outer end of the rear electrode and an opposite outer end, and with the bore including an inner cylindrical end portion and an outer end portion which is cup-shaped in cross section to define an outwardly facing radial shoulder, and with the inner cylindrical end portion having a substantial axial length;

d a tubular sleeve member mounted to the housing and coaxially surrounding the front electrode in a spaced apart arrangement so as to define an annular passageway between the front electrode and the sleeve that extends along substantially the entire axial length of the front electrode;

e. a coolant flow path that extends through the housing and communicates with the annular passageway such that a fluid coolant circulates through the annular passageway to remove heat from the front electrode during operation of the torch;

f. a vortex mechanism that generates a vortical flow of a gas at a location intermediate the rear and outer electrodes and that is in coaxial alignment with the rear and front electrodes; and g. a power supply means connected to the rear and front electrodes that generates an arc that is adapted to extend axially from the rear electrode through the vortical flow of gas and to an attachment located on the bore of the front electrode.

2. The non-transferred plasma arc torch for use in a fuel gas generator system of claim 1, wherein the non-transferred plasma arc torch has a coating disposed on the front electrode and rear electrode comprising a member of the group: nickel, silver, platinum, alloys thereof, and combinations thereof.

3. The non-transferred plasma arc torch for use in a fuel gas generator system of claim 1, wherein the wherein the non-transferred plasma arc torch has a coating disposed on the front electrode and rear electrode comprising 70% silver, 20% platinum, and 10% nickel.

4. The non-transferred plasma arc torch for use in a fuel gas generator system of claim 1, wherein the non-transferred plasma arc torch has a pivotably base.

5. The non-transferred plasma arc torch for use in a fuel gas generator system of claim 1, wherein the non-transferred plasma arc torch is a 2-megawatt DC-powered torch.

6. The non-transferred plasma arc torch for use in a fuel gas generator system of claim 1, wherein the coolant flow path extends serially along the outer surface of the rear electrode and through the annular passageway, and such that a fluid coolant may be circulated through the coolant flow path to remove directly heat from both the rear electrode and front electrode during operation of the torch.

7. A transferred plasma arc torch for use in a fuel gas generator system for generating electricity from waste, wherein fuel gas generator system comprising a vessel comprising a front, a back, a bottom, a first side, a second side, a third side, and a feed ramp; a moveable non-transferred plasma torch disposed in at least one side of the vessel for contacting the waste and creating molten material; a moveable transferred plasma torch disposed in at least one side of the vessel for contacting the molten material; at least one steam injector disposed in at least one side of the vessel; at least one molten material outlet disposed in the back of the vessel; a dry scrubber connected to the vessel for receiving gas from the vessel and forming treated gas; a wet scrubber connected to the dry scrubber for scrubbing the treated gas; a steam boiler connected to the wet scrubber for receiving the scrubbed treated gas and burning the gas creating steam; and a steam turbine connected to the steam boiler for creating electricity, and wherein the non-transferred plasma arc torch comprises:

a. a torch housing;

b. an electrode mounted within the housing and comprising a tubular metal member having a closed inner end and an open outer end;

c. a tubular sleeve member mounted to the housing and coaxially surrounding the electrode in a spaced apart arrangement so as to define an annular passageway between the electrode and the sleeve that extends along substantially the entire axial length of the electrode;

d. a coolant flow path that extends through the housing and communicates with the annular passageway such that a fluid coolant circulates through the annular passageway to remove heat from the electrode during operation of the torch;

e. a vortex mechanism that generates a vortical flow of a gas; and f. a power supply means connected to the electrode that generates an arc that is adapted to extend axially from the electrode through the vortical flow of gas.

8. The transferred plasma arc torch for use in a fuel gas generator system of claim 1, wherein the non-transferred plasma arc torch has a coating disposed on the front electrode and rear electrode comprising a member of the group: nickel, silver, platinum, alloys thereof, and combinations thereof.

9. The transferred plasma arc torch for use in a fuel gas generator system of claim 1, wherein the wherein the non-transferred plasma arc torch has a coating disposed on the front electrode and rear electrode comprising 70% silver, 20% platinum, and 10% nickel.

10. The transferred plasma arc torch for use in a fuel gas generator system of claim 1, wherein the non-transferred plasma arc torch has a pivotably base.

11. The transferred plasma arc torch for use in a fuel gas generator system of claim 1, wherein the non-transferred plasma arc torch is a 2-megawatt DC-powered torch.

12. The transferred plasma arc torch for use in a fuel gas generator system of claim 1, wherein the coolant flow path extends serially along the outer surface of the rear electrode and through the annular passageway, and such that a fluid coolant may be circulated through the coolant flow path to remove directly heat from both the rear electrode and front electrode during operation of the torch.

* * * * *